US007824752B2

(12) United States Patent
George

(10) Patent No.: US 7,824,752 B2
(45) Date of Patent: Nov. 2, 2010

(54) FAN-FOLDED WEB OF PRESSURE-SENSITIVE LABELS

(75) Inventor: John W. George, St. Joseph, MO (US)

(73) Assignee: Express Card and Label Co., Inc., Topeka, KS (US)

( * ) Notice: Subject to any disclaimer, the term of this patent is extended or adjusted under 35 U.S.C. 154(b) by 518 days.

(21) Appl. No.: 11/172,540

(22) Filed: Jun. 30, 2005

(65) Prior Publication Data

US 2007/0004575 A1 Jan. 4, 2007

(51) Int. Cl.

| | |
|---|---|
| ***B32B 9/00*** | (2006.01) |
| ***B32B 33/00*** | (2006.01) |
| ***G09F 3/00*** | (2006.01) |
| ***G09F 3/10*** | (2006.01) |

(52) U.S. Cl. .................... 428/40.1; 428/41.8; 428/42.2; 428/42.3; 428/43; 40/299.01; 40/672; 40/674

(58) Field of Classification Search ................ 428/40.1, 428/41.8, 43, 42.2, 42.3; 40/299.01, 672, 40/674

See application file for complete search history.

(56) References Cited

U.S. PATENT DOCUMENTS

| | | | |
|---|---|---|---|
| 1,015,580 A | 1/1912 | Nichols | |
| 1,186,018 A | 6/1916 | Meisel | |
| 1,541,201 A | 6/1925 | Wennerblad et al. | |
| 2,819,068 A | 8/1954 | Loase | |
| 3,406,959 A | 10/1968 | Ross | |
| 4,270,911 A | 6/1981 | McNew | |
| 4,438,696 A | 3/1984 | George et al. | |
| 4,522,619 A | 6/1985 | Bunch, Jr. | |
| 4,765,604 A | 8/1988 | Trogan | |
| 4,876,131 A * | 10/1989 | Ashby et al. | 428/42.3 |
| 4,909,148 A | 3/1990 | George | |
| 5,030,192 A * | 7/1991 | Sager | 493/414 |
| 5,348,780 A * | 9/1994 | Boggs et al. | 428/42.3 |
| 5,882,767 A | 3/1999 | Simmons, Jr. | |
| 6,283,024 B1 | 9/2001 | George | |
| 2003/0138598 A1 | 7/2003 | Rawlings | |

* cited by examiner

*Primary Examiner*—Patricia L Nordmeyer
(74) *Attorney, Agent, or Firm*—Hovey Williams LLP

(57) ABSTRACT

A label product in web form has alternating, oppositely indented creases in the liner of the product to produce a fan-folded stack having alternating, reversely folded plies. Each crease is substantially, if not entirely, perforation-free to maximize the strength of the liner at the fold lines. The product is preferably produced on a narrow web press in a creasing station that includes a stack of rolls wherein a first die roll is on the bottom of the stack, a second die roll is on the top of the stack, and a pair of base rolls are located in the middle of the stack between the die rolls. A blade on each die roll cooperates with a cushion on the corresponding base roll to produce a crease during every other rotation of the die roll, each of the base rolls having a smaller circumference than its corresponding die roll.

2 Claims, 8 Drawing Sheets

FAN-FOLDED WEB OF PRESSURE-SENSITIVE LABELS

TECHNICAL FIELD

The present invention relates to fan-folded webs of label products such as those typically produced on high-speed narrow web presses. More particularly, it relates to a fan-folded web label product having alternately reversely indented creases defining its fold lines that are substantially, if not entirely, devoid of perforations.

BACKGROUND AND SUMMARY

Pressure-sensitive labels are typically produced in web form on high-speed narrow web presses wherein the web width typically does not exceed 18 inches. Such machines may be of the offset, rotary letter press, flexographic, or gravure type. Typically, a pressure-sensitive label product is made from a carrier or liner that comprises a continuous web of paper coated with a release agent on the top side and a face paper stock that is coated on its underside with a pressure-sensitive adhesive. These two continuous webs are laminated together with the face stock situated above the liner. The adhesive on the underside of the face paper stock contacts the release coating on the top side of the liner so as to permit the face stock to eventually be separated in the form of labels from the liner without tearing. Prior to separation, the face stock is cut into shapes by rotary dies that do not penetrate through the liner, and the waste face paper stock around the die cut is lifted from the liner to leave a series of successive labels on the liner for further disposition. The labels adhere just enough to the liner to remain attached until being intentionally and automatically separated from the liner.

Rough handling may cause the fragile labels to accidently separate and fall from the liner. This is particularly true when repositionable adhesives are used as the pressure-sensitive adhesive, allowing the labels to be attached, removed and reattached numerous times to a selected surface.

In many instances, newspaper companies are now applying labels to the front page of a newspaper edition for advertising purposes. Such labels are removable from the newspaper by the reader without damaging the newspaper. Typically, the labels are printed on a narrow web press as a web label product, fan-folded into a stack as they issue from the end of the press, and packed into a box that is in turn provided to the newspaper printing establishment. At the newspaper company, the labels are dispensed and applied automatically to the newspapers at speeds sometimes exceeding 1,000 labels per minute.

Fan-folding of webs of pressure sensitive labels is currently accomplished by cross-perforating the web to produce a line of weakness at which the fold can be made. The perforations weaken the liner sufficiently that the web will bend easily at the perforation line and permit fan-folding into the shipping container. However, that same weakened condition creates problems when the labels are to be dispensed at high speeds and applied to the moving newspapers because the perforated liner has a tendency to break at the perforations as a result of the tension and rough handling to which the web is subjected. When a break of the liner occurs as the labels are being applied to newspapers, several thousand newspapers can pass without receiving a label by the time the labeling machine is rethreaded and back in operation. Advertisers have paid for the label to be on the newspapers, but there may be many delivered to customers without the advertisements adhered to the front pages.

Labels are typically supplied to newspaper companies in fan-folded stacks rather than rolls because several fan-folded stacks can be spliced together to provide a continuous supply of labels, whereas if the labels are supplied in roll form, the machine must be stopped when it is time to replace a depleted roll with a new full roll of labels. However, modern fan-folders that produce such stacks typically operate in line with the web presses at speeds approaching 500-1000 feet per minute, and tension must be kept on the web as it leaves the press and enters the fan-folding machine. Such tension and high speed can combine to cause the cross-perforated webs to break on occasion, and it is always important that the labels be handled as gently as possible to avoid accidentally knocking them loose from the liner.

Typically, adjacent labels on the liner are separated by very narrow gaps or spaces which are many times smaller than the length of the labels themselves. Such gaps are typically no larger than 0.125 inches wide. The cross perforation and subsequent fold line must occur precisely within such spaces without damaging the labels themselves.

The present invention provides a fan-folded web of pressure-sensitive labels wherein the successive fold lines of the product are presented by alternating, oppositely indented creases in the web that are substantially, if not entirely, free of perforations. Such a product substantially eliminates the handling and breakage problems associated with conventional cross-perforated webs of labels both at the production and application ends of the process. In a preferred method and apparatus for making the product, a single rotary die station of a narrow web label press is converted into a creasing station. At such creasing station, the web that carries the pressure-sensitive labels is trained around a stack of die and base rolls in such a manner that alternating, oppositely indented creases or pre-folds are produced in the liner web at predetermined intervals along its length at the gaps between the labels without damaging or loosening the pressure-sensitive labels. Immediately following the crease-forming operations, the web can be introduced into a fan-folding machine which prepares a stack of fan-folded web product for subsequent packaging, the web being slit if necessary longitudinally as it leaves the creasing station and before it enters the fan-folding machine. In a most preferred form of the invention, no perforations at all are present in the pre-fold creases so as to provide maximum strength. However, in some instances a small number of perforations may be acceptable.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
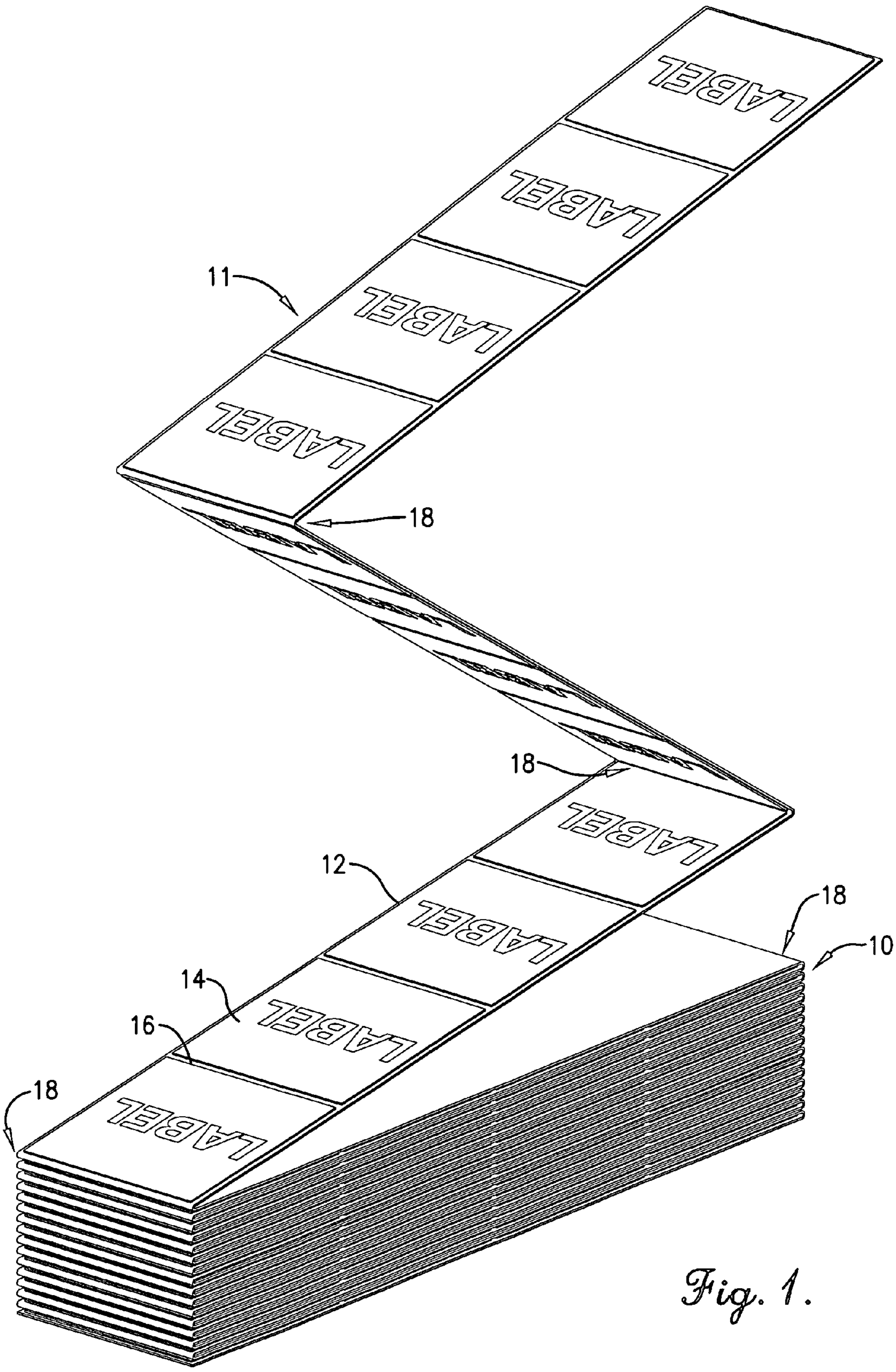
FIG. 1 is an isometric view of a web label product in accordance with the present invention fan-folded into a stack having alternately oppositely indented creases at the fold lines of the plies.

FIG. 1 shows a stack 10 of fan-folded web label product 11 in accordance with the present invention. The product 11 broadly comprises an elongated liner 12 of paper material having pressure sensitive labels 14 removably attached thereto at spaced locations along its length. The space 16 between each pair of labels 14 is quite small relative to the length of each label, e.g., the labels 14 may be on the order of 20-25 times the width of the space 16. In one preferred embodiment, for example, the width of a space 16 is no greater than approximately 0.125 inches, while the length of each label is 3.0 inches. Although the length of each ply in the stack 10 may vary, in the exemplary embodiment each ply is 12.5 inches long.

The web label product 11 is provided with a series of transversely extending, alternately oppositely indented creases 18 that present the fold lines at opposite ends of each ply. Creases formed by indenting the non-label side of web 11 may, for convenience, be referred to as "outside creases" while those formed by indenting the label side of web 11 may be referred to as "inside creases." Each crease 18 is located totally within a gap or space 16 between successive labels 14 and does not encroach upon adjacent portions of labels 14. The oppositely indented nature of successive creases 18 creates in the web 11 a predisposition to fold in a zig-zag or fan-folded manner as illustrated. In a most preferred embodiment of the invention, each crease 18 is devoid of perforations, although it is possible that a small number of perforation cuts could be included within a crease or at its opposite ends without departing from the principles of the present invention, i.e. without unduly weakening the web. In such instance the crease 18 would be substantially, but not totally, devoid of perforations. For example, depending upon the tear strength of the liner 12 as influenced by its width, the size of the perforations, and the nature of the paper stock from which liner 12 is made, having from one to ten perforations that resulted in no more than about 25% of the length of the crease being devoted to perforation cuts could probably provide satisfactory results.

Figure 2:
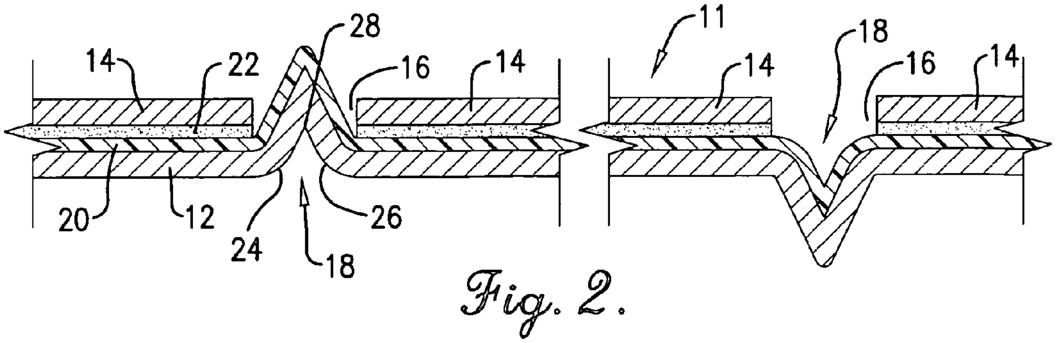
FIG. 2 is an enlarged, fragmentary cross sectional view of the web product illustrating details of construction, the thicknesses of the release coating on the liner of the web product and the pressure sensitive adhesive on the labels being exaggerated for illustrative purposes.
Figure 6:
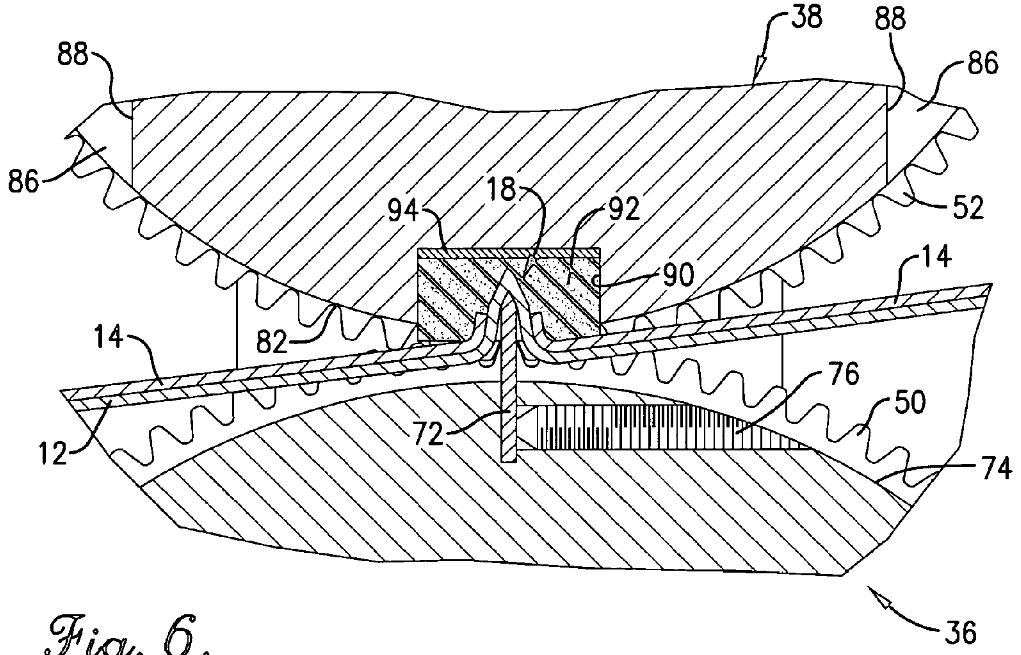
FIG. 6 is an enlarged, fragmentary cross sectional view of the lower part of the creasing station illustrating the manner in which an outside crease is formed in the non-label side of the liner.
Figure 7:
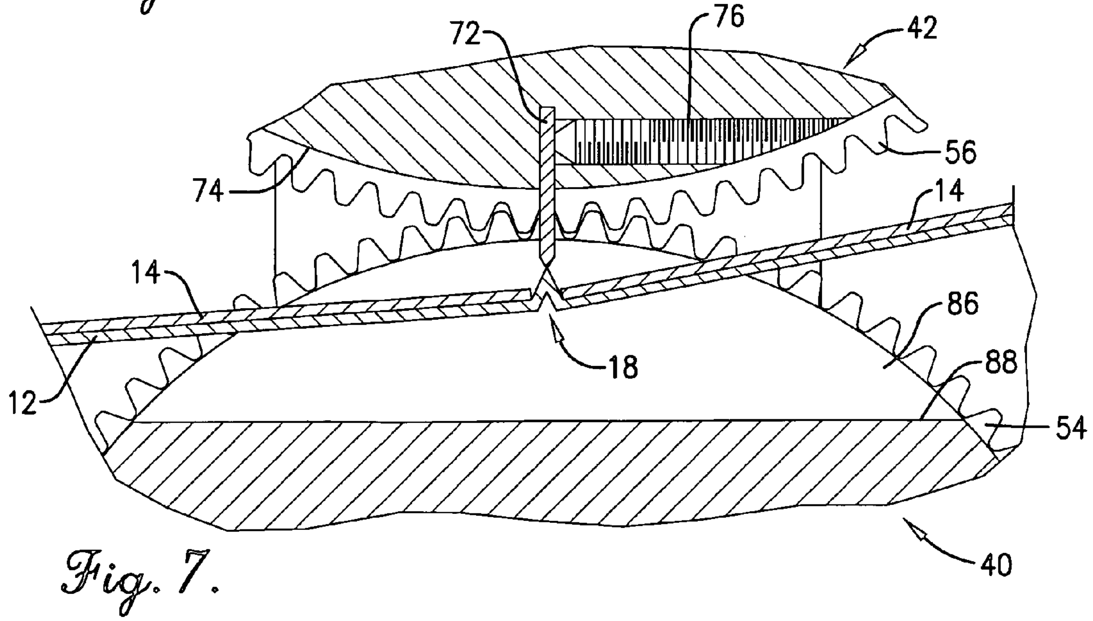
FIG. 7 is an enlarged, fragmentary cross sectional view of the upper part of the creasing station illustrating the manner in which the creasing blade of the upper die roll has no adverse effect on an outside crease previously made by the lower die roll.

As illustrated in FIG. 2, the web product 11 is of laminated construction, with the top side of liner 12 having a release coating 20 as well understood by those skilled in the art. The bottom side of each label 14 is provided with a pressure-sensitive adhesive coating 22 which is also well understood by those skilled in the art (the thickness of coatings 20, 22 is exaggerated in FIG. 2). Adhesive coating 22 is in direct contacting engagement with release coating 20 so as to permit labels 14 to be peeled off liner 12 at the appropriate time without tearing. Each crease 18 preferably includes a pair of converging side surfaces 24 and 26 that meet at an apex 28, it being noted that only liner 12 is indented to form the crease without deformity or involvement of adjacent portions of labels 14 on opposite sides of the crease 18.

Figure 3:
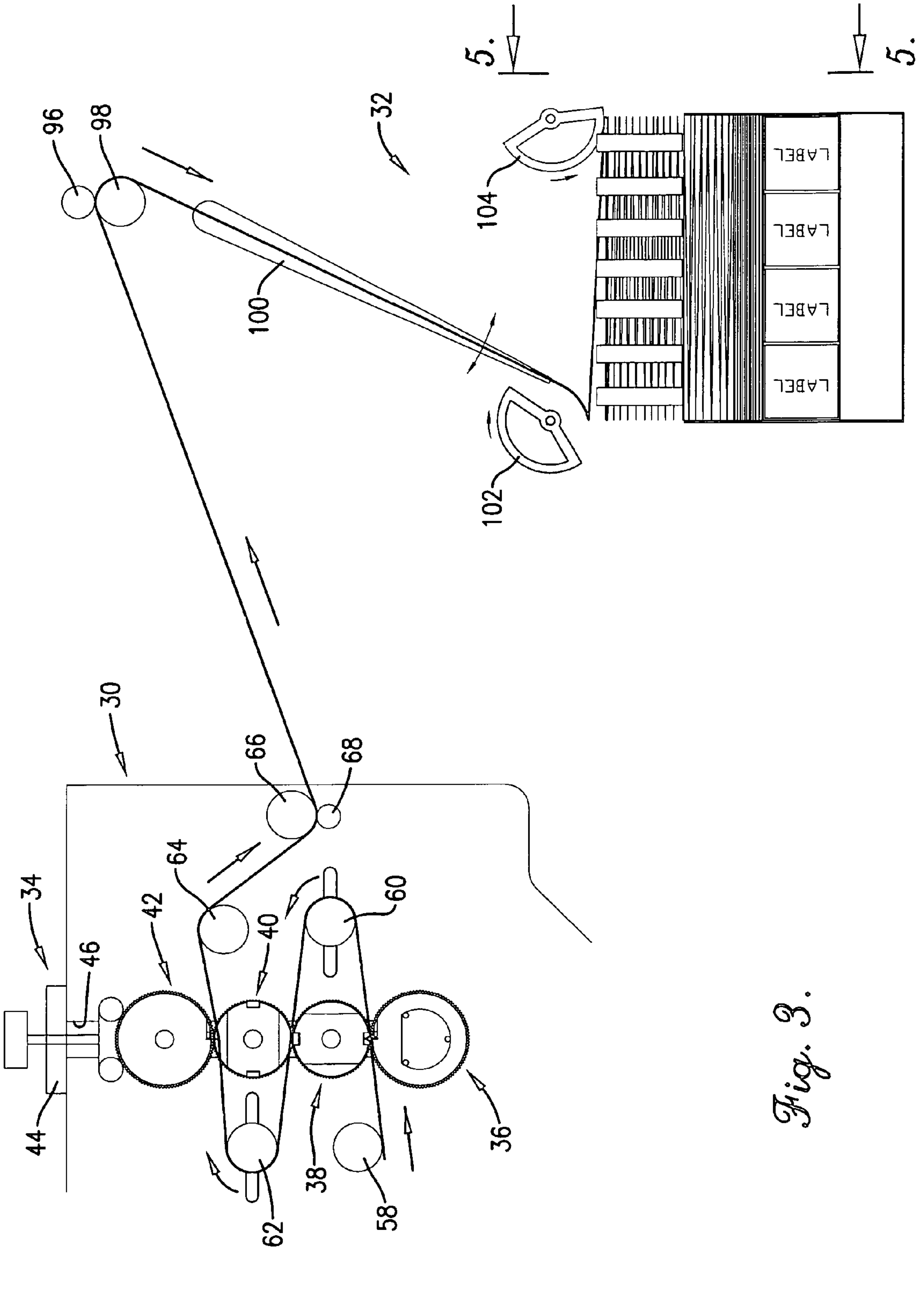
FIG. 3 is a schematic, fragmentary view of equipment utilized in making the web label product and fan-folding it into a stack, including a narrow web press and a fan-folding machine.

FIG. 3 is a schematic representation of equipment for producing a fan-folded stack 10 in accordance with the present invention. The primary pieces of equipment illustrated in FIG. 3 are a modified high-speed narrow web label press 30 and a downstream fan-folding machine 32. The press 30 has a special creasing station 34 in accordance with the present invention but may otherwise take the form of a conventional narrow web label press. One such machine is disclosed in prior U.S. Pat. No. 4,438,696 owned by the assignee of the present invention. The '696 patent is hereby incorporated by reference into the present specification. See also U.S. Pat. No. 4,909,148 which is also incorporated by reference into the present specification. One suitable fan-folding machine for performing the function of fan-folding machine 32 is available from B. Bunch Company, Inc. of Phoenix, Ariz. as the Model 317. The basic principles of such a machine are disclosed in U.S. Pat. No. 4,522,619 which is hereby incorporated by reference into the present specification.

Among other things, creasing station 34 includes a stack of four rolls comprising a lowermost die roll 36, a base roll 38 immediately above and cooperating with die roll 36, a second base roll 40 immediately above base roll 38, and an uppermost die roll 42 that cooperates with base roll 40. The entire stack is maintained in position by schematically illustrated hold down mechanism 44, as well understood by those skilled in the art. Shafts of the rolls 36-42 project through vertical slots 46 (only one being shown) in opposed sidewalls 48 (only one being shown) of the press 30. Circumferentially extending gear teeth 50, 52, 54 and 56 associated with the rolls 36-42 respectively maintain such rolls in positive synchronous relationship when driving power is supplied to one of the rolls.

Figure 4:
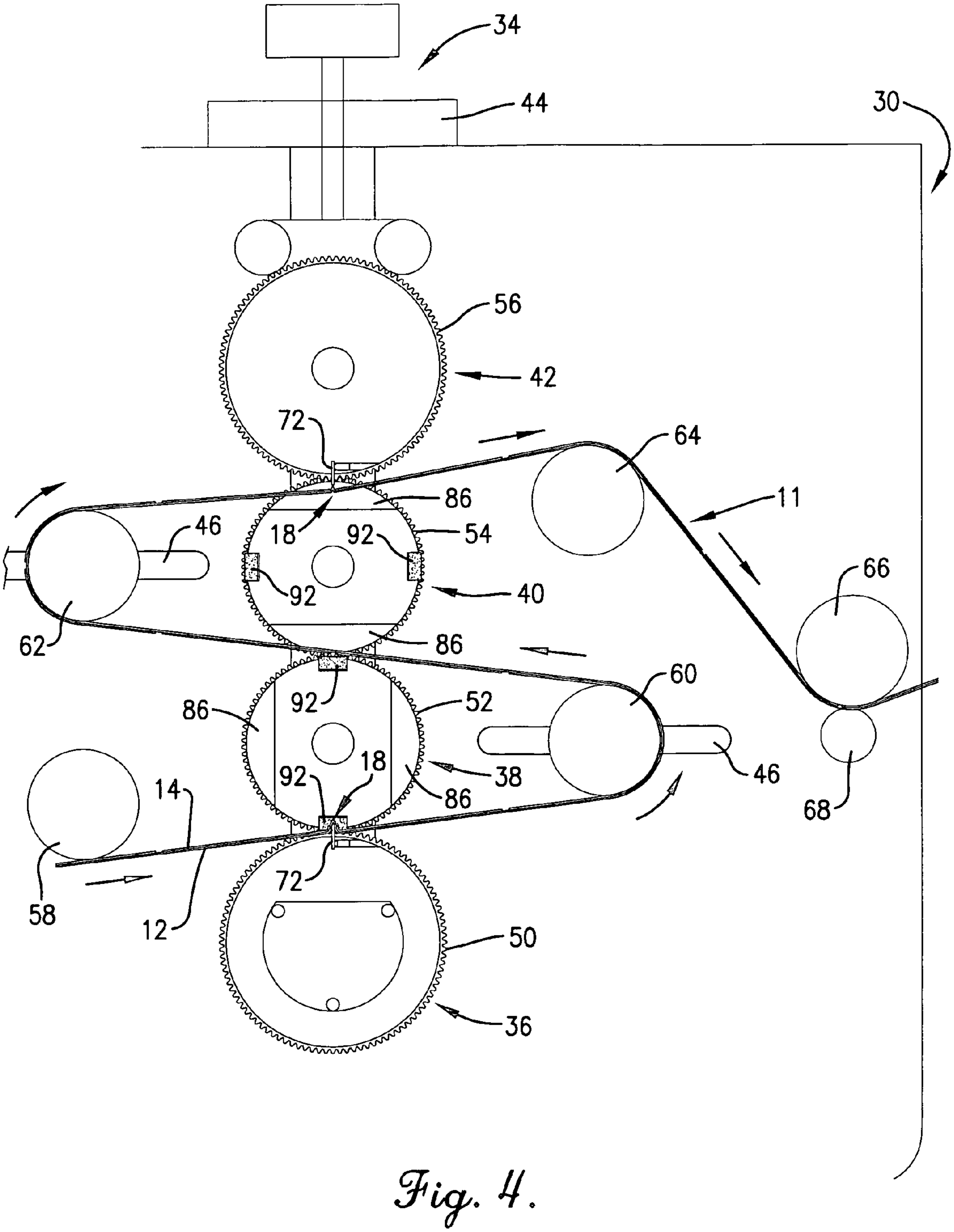
FIG. 4 is an enlarged, schematic fragmentary view of the narrow web press and the creasing station in accordance with the present invention.

In addition to rolls 36-42, creasing station 34 also includes four guide rolls 58, 60, 62 and 64. Guide roll 58 is a lead-in guide roll positioned to help guide the liner with attached labels into position between die roll 36 and base roll 38. From there the liner with its labels is looped around guide roll 60 and returned to the stack to pass between base rolls 38 and 40. Upon leaving base rolls 38 and 40, the liner with attached labels loops around guide roll 62 and returns toward the stack to pass between base roll 40 and die roll 42, whereupon it exits the stack as alternately reversely creased web label product 11 under the guiding influence of the exit guide roll 64. From guide roll 64, web product 11 passes between a pair of downstream rolls 66 and 68, at which location it may be slit longitudinally to produce two or more side-by-side, narrower web products depending upon the nature of the product being produced and the downstream fan-folding mechanism. Preferably, at least guide roll 62, and preferably both guide rolls 60 and 62, are individually adjustable toward and away from the stack using conventional adjustment means represented in part by the horizontally disposed slots 70 as illustrated in FIGS. 3 and 4. As will hereinafter be explained in more detail, such adjustment is desired in order to precisely determine the length of the liner with attached labels between lower die roll 36 and upper die roll 42.

As illustrated best in FIGS. 6-9, each of the die rolls 36, 42 includes a creasing blade 72 that projects outwardly a short distance beyond a cylindrical periphery 74 of the roll. The cylindrical periphery 74 is longitudinally slotted to receive blade 72, and a series of set screws 76 removably retain blade 72 in place. Die rolls 36 and 42 are also provided with bearer rings 78 at their opposite ends that are slightly larger in diameter than the peripheral surfaces 74 for bearing against corresponding bearer rings 80 of base rolls 38 and 40 for maintaining the proper running relationships between the rolls. It will be appreciated that the liner with its attached labels is slightly narrower than the distance between the bearer rings on each roll and is centered between the rings without engaging the same. Die rolls 36 and 42 each have exactly the same circumference but are 180° out of phase with one another as illustrated best in FIG. 4.

Base rolls 38 and 40 are identical to one another but are 90° out of phase with each other as best shown in FIG. 4. In a preferred embodiment of the invention, base rolls 38, 40 are smaller in circumference than die rolls 36 and 42. In one particularly preferred embodiment of the invention as illustrated in the drawings, the base rolls 38, 40 each have a circumference that is 80% that of the corresponding die rolls 36 and 42.

Each of the base rolls 38, 40 is specially configured so as to have alternating regions of working surfaces and voids. In the particular embodiment disclosed herein, each base roll 38, 40 has a pair of diametrically opposed work surfaces 82 (see FIG. 9) separated by a pair of diametrically oppositely disposed voids 86. Voids 86 are presented by radially recessed flat surfaces 88. Thus, as the circumference of a base roll is traversed, working surfaces and voids are alternately presented. Each working surface 82 has a longitudinally extending channel 90 therein that receives and removably retains a complementally shaped cushion 92 constructed from a suitable elastomeric material having a hardness of approximately 55 Shore A. A strip 94 of double-sided tape or the like is used to releasably secure cushion 92 within channel 90. As illustrated best in FIGS. 8 and 9, each cushion 92 terminates at its opposite ends at the bearer rings 80.

The two base rolls 38 and 40 are 90° out of phase with one another so that the cushions 92 of one base roll never come into contacting engagement with those of the other base roll. It will also be noted that the lower die roll 36 and the top die roll 42 have their blades 72 disposed for contacting engagement with a cushion 92 of their cooperating base roll on every other rotation of the die roll. Thus, taking lower die roll 36 as an example, after one 360° rotation of die roll 36 from the position illustrated in FIG. 4, blade 72 will be disposed at the twelve o'clock position, but a void 86 will be in opposed relationship to it, rather than one of the cushions 92. Only after the second complete rotation of die roll 36 from its FIG. 4 position will the base roll 38 have one of its cushions 92 in position to coact with blade 72 of die roll 36. When the blade 72 and cushion 92 coact as illustrated in the enlarged view of FIG. 6, an outside crease 18 is formed in the liner 12 as blade 72 engages and indents the non label-bearing side of liner 12. Top die roll 42 does the same thing from the label-bearing side of liner 12 to produce an inside crease 18 in liner 12 when its blade 72 coacts with one or the other of the cushions 92 of base roll 40.

The length of the liner 12 between bottom die roll 36 and top die roll 42 is exactly twice the circumference of the die rolls 36, 42. Thus, in one exemplary embodiment, die rolls 36 and 42 each have a circumference of 12.50 inches. Accordingly, the serpentine length of the liner from lower die roll 36 around guide rolls 60, 62 and to the top die roll 42 is exactly 25.0 inches. This accommodates labels that are 3.0 inches in length and are separated by a gap or space of 0.125 inches.

As illustrated in FIG. 4, at the instant the lower die roll 36 is making an outside crease from the non label-bearing side of liner 12, the blade 72 of top die roll 42 is in position for making a crease from the label side of the liner but has no cushion 92 to coact with it. Thus, blade 72 of top die roll 42 aligns only with a void 86 as illustrated in detail in FIG. 7 and has no creasing effect on liner 12 at that time. In fact, at the time blade 72 of top die roll 42 is in the position illustrated in FIGS. 4 and 7, an outside crease 18 previously made by lower die roll 36 is aligned with blade 72 of top die roll 42, but without any adverse effect. After one more revolution of top die roll 42 and 12.50 inches of additional travel of liner 12, blade 72 of top die roll 42 will come into coacting alignment with a cushion 92 on base roll 40 to make an inside crease 18 from the label side of the liner. Thus, the web product 11 exiting from the creasing station 34 and passing over guide roll 64 has alternating, oppositely indented creases 18 every 12.50 inches of web length. This translates into a fan-folded stack 10 having plies that are each 12.50 inches in length.

By using a creasing station 34 in accordance with the present invention, the label length and ply length or distance between creases 18 can be easily varied. Appropriately sized rolls 36-42 can be readily utilized and replaced at station 34, along with the necessary adjustment of guide roll 62 and also guide roll 60 if available, to provide the desired "repeat" for the creases within the web. By utilizing a stack of multiple rolls, the individual roll diameters can be kept relatively small and manageable.

Figure 5:
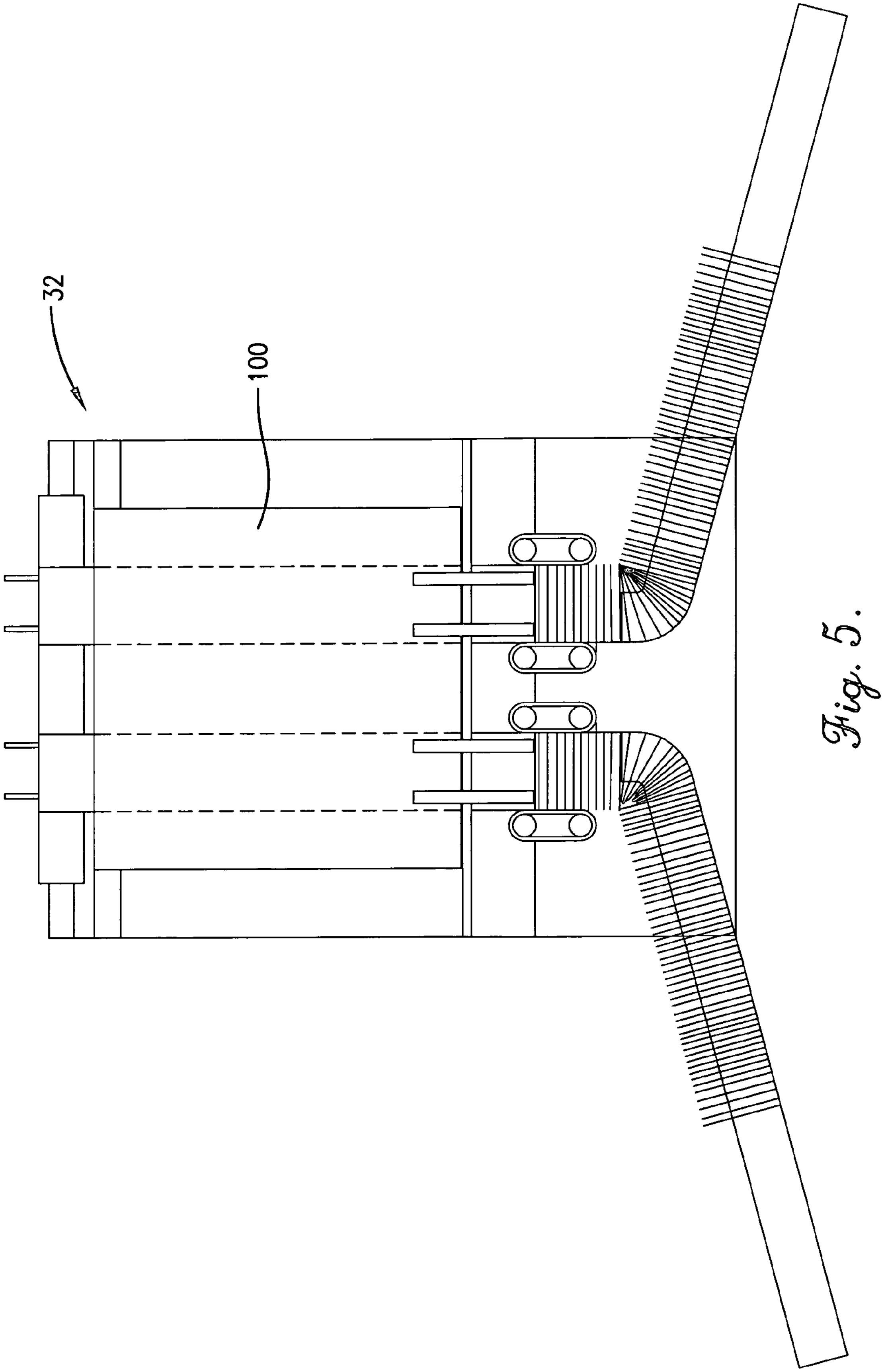
FIG. 5 is a schematic end elevational view of the folding machine of FIG. 3 taken substantially along line 5-5 of FIG. 3.
Figure 8:
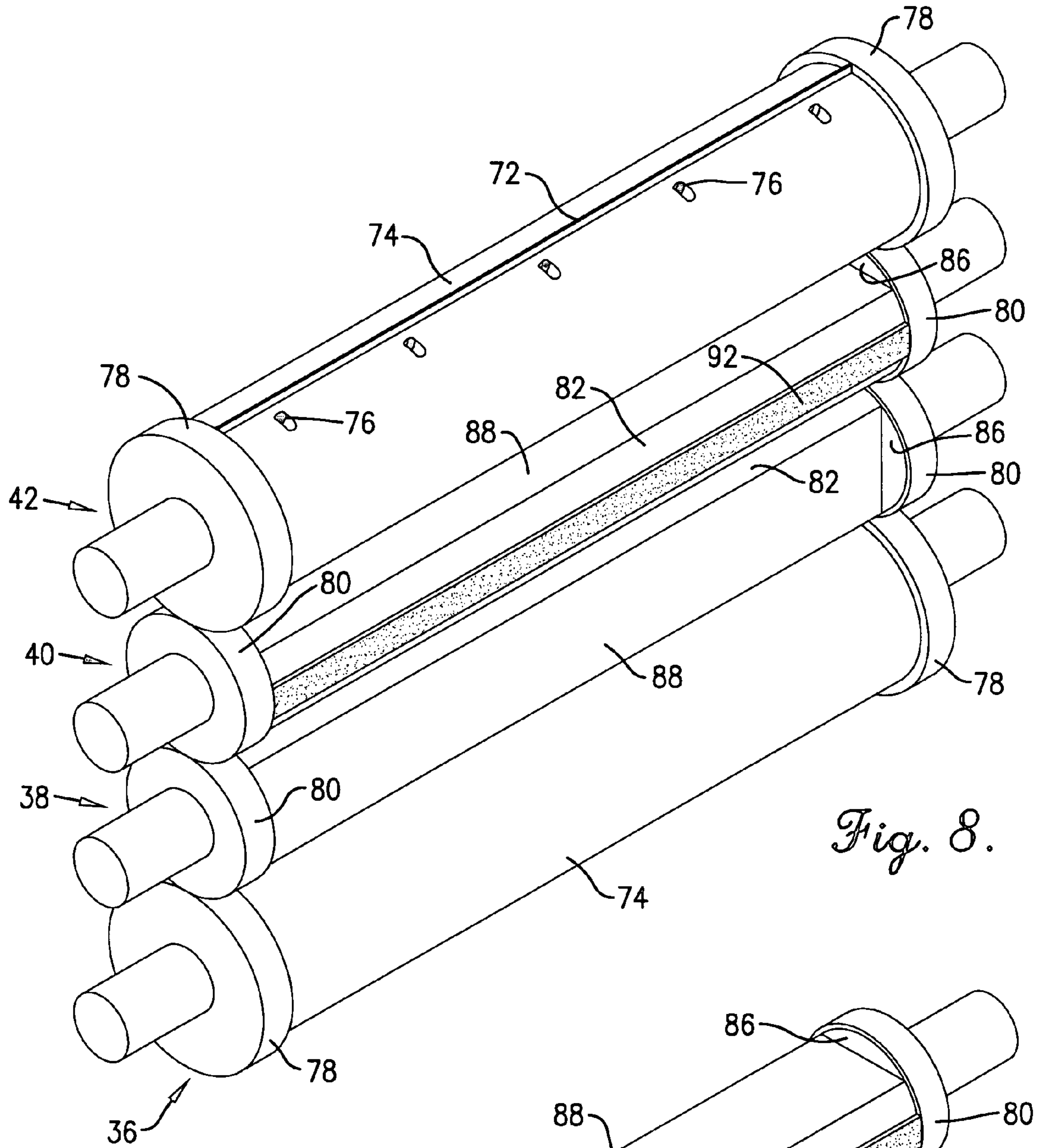
FIG. 8 is an isometric view of the stacked rolls at the creasing station.
Figure 9:
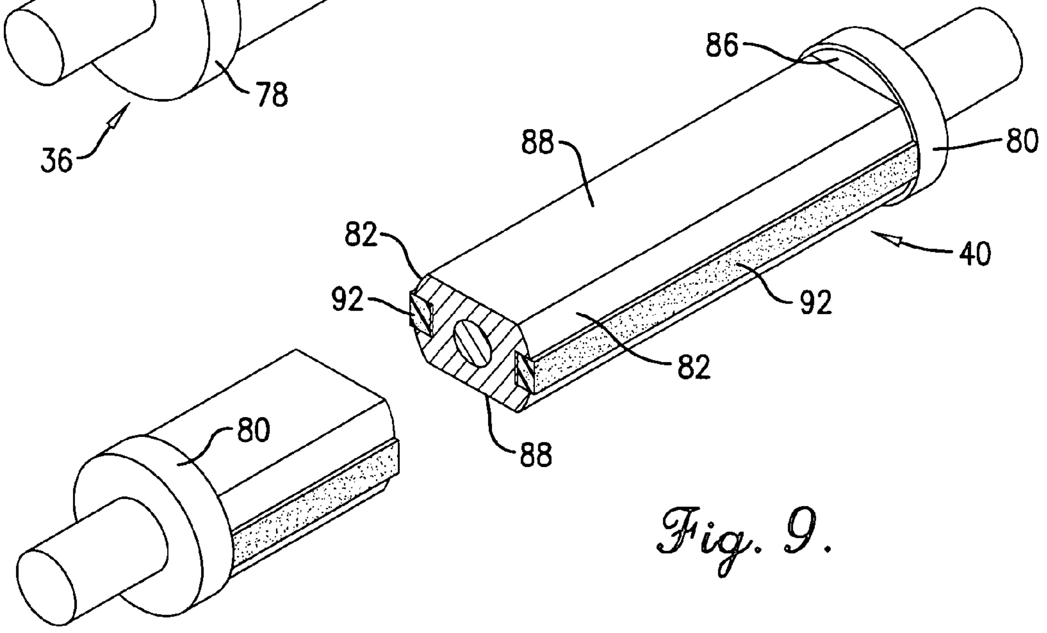
FIG. 9 is an isometric view of one of the base rolls of the creasing station.

After leaving the press 30, the web product 11 passes between a pair of nip rolls 96 and 98 that continue to apply tension to web product 11 before it enters fan-folding machine 32. Upon entering machine 32, the web passes through an oscillating paddle 100 that, in cooperation with a pair of oppositely disposed compression wheels 102 and 104, causes web product 11 to become fan-folded in the manner illustrated in FIG. 1. The stack is turned within machine 32 and exits the latter somewhat horizontally as illustrated, for example, in FIG. 5, whereupon the stack may be placed in a suitable container for shipment to the newspaper printing company or other entity at which the labels are applied to the newspapers. The particular fan-folding machine 32 illustrated in the drawings is capable of producing multiple stacks of the fan-folded webs.

Figure 10:
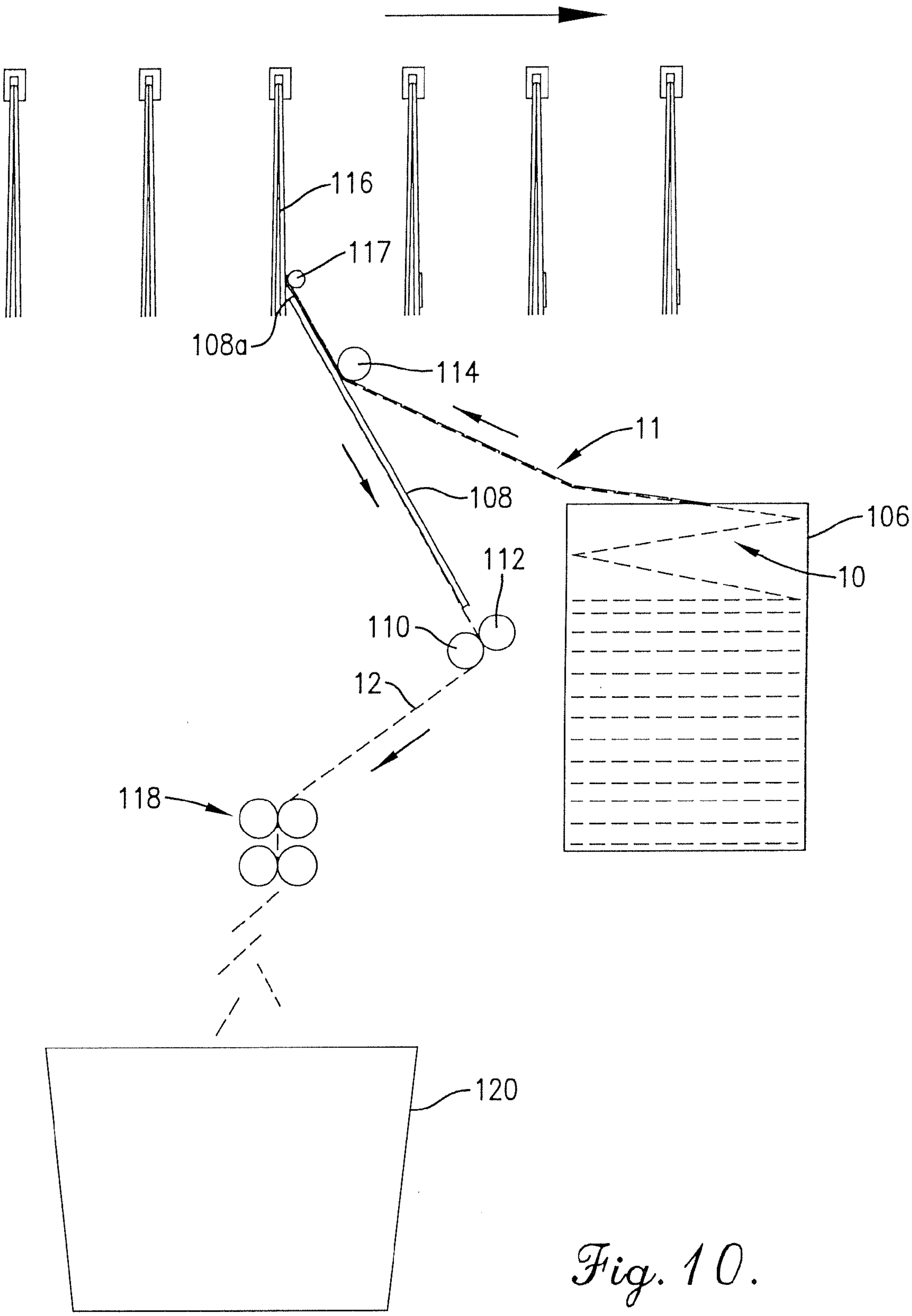
FIG. 10 is a schematic illustration of equipment used in applying pressure-sensitive labels from the web product of the present invention to a continuously moving, high-speed stream of newspapers or other articles.
Figure 11:
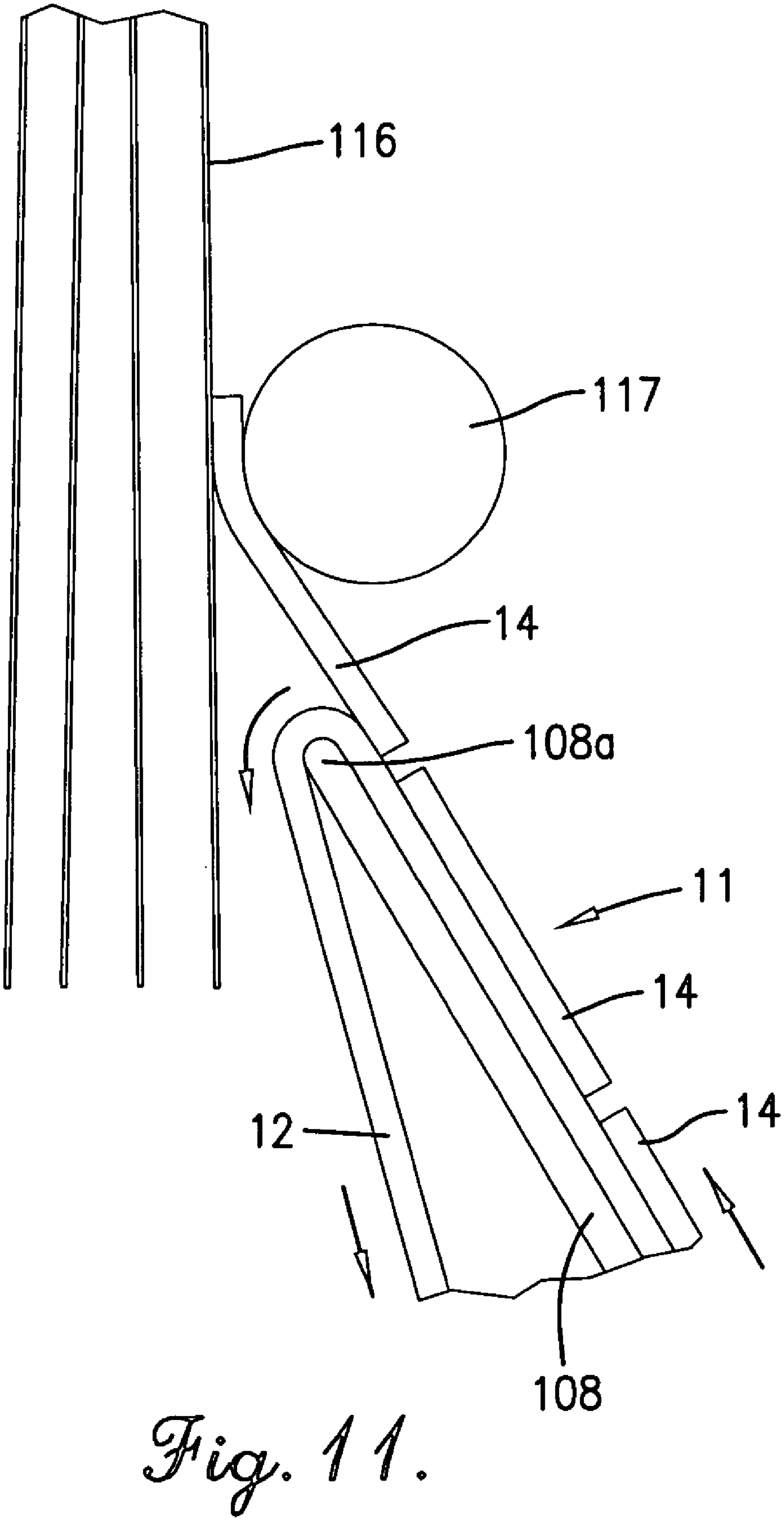
FIG. 11 is an enlarged, schematic illustration of the point at which the label applying equipment of FIG. 10 attaches a label to a newspaper.

FIGS. 10 and 11 illustrate the process by which the labels are applied to newspapers at the printing facility or other establishment. FIG. 10 illustrates a fan-folded stack 10 arranged in a vertical orientation so that web product 11 is pulled upwardly out of an upright container 106 and directed toward an upwardly inclined peel plate 108 (in practice, trailing and leading ends of several fan-folded stacks may be spliced together to provide a non-stop supply of web product 11 to the stream of newspapers). The web is looped over the uppermost edge 108*a* of peel plate 108 and is directed downwardly along the underside of peel plate 108 by a pair of coacting, oppositely driven nip rollers 110 and 112 that maintain tension in the web. Rather than operating smoothly and continuously, the pull rolls 110 and 112 operate in a staccato-like manner with short, very rapid start and stop motions so as to repeatedly jerk the web out of container 106 and over edge

108*a* of peel plate 108. In prior art constructions of the web wherein cross perforations were utilized, breakage of the web would sometimes occur at the peel plate edge 108*a* due to the tension placed on the web by pull rolls 110, 112 and their jerking actions.

On the front side or upper side of peel plate 108, the web product 11 passes under an idler roll or bar 114 before moving to the peel plate edge 108*a*. As illustrated best in FIG. 11, as web 11 is pulled around edge 108*a*, the labels 14 with their adhesive surfaces exposed are caused to self-strip from liner 12 and to project upwardly into the path of travel of an oncoming stream of newspapers 116, which may be moving at speeds on the order of 1,000 newspapers per minute, on a continuous basis. As each label 14 in succession projects off the end of peel plate 108 as illustrated in FIG. 11, web 11 stops for an instant and awaits the oncoming newspaper 116. As the newspaper 116 engages the awaiting label 14, the pressure-sensitive adhesive layer thereof contacts the surface of the newspaper and causes the label to become affixed thereto, under the influence of a pressing roll 117 or other idler. The newspaper and its attached label 14 then move beyond roll 117 to the next processing station as illustrated in FIG. 10. Downstream from pull rolls 110 and 112, the label-free liner 12 passes through a waste chopper 118 wherein the remnants of the liner gravitate into a suitable waste collector 120.

It should be apparent from the foregoing that in one aspect the present invention provides a delicate, fan-folded, at least virtually perforation-free, pressure-sensitive label product that will withstand the rough handling commonly experienced by such products both during their production and subsequent commercial applications. Among other things, it permits the application of pressure-sensitive, repositionable labels to high-speed articles such as newspapers and the like with substantially increased reliability. In another aspect of the invention, the web creasing station that enables production of such a product requires no off-press driving mechanism since it is powered by the press itself and it has no adverse effect on the normal operation of the press. It can operate at high speeds, will not damage the labels, fits within a narrow web press rotary die station, and can be easily removed or replaced when other fan-fold lengths are desired.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. A fanfolded web label product comprising:

an elongated liner having a release coating on at least one side thereof;

a plurality of labels removably attached to said liner at spaced locations along the length thereof, each of said labels having a bottom surface provided with a pressure-sensitive adhesive coating in contact with the release coating on said one side of the liner; and a series of transversely extending, alternately oppositely indented pre-fold creases in said liner at predetermined ones of the spaces between the labels, said liner with attached labels being alternately reversely folded at said creases to present a fanfolded stack having alternating, reversely folded plies, each of said creases being substantially devoid of perforations, each of said creases having perforation cuts that collectively comprise no more than about 25% of the length of the crease.

2. A fanfolded web label product as claimed in claim 1, said pressure-sensitive adhesive comprising a repositionable adhesive.

* * * * *